United States Patent
Öttinger et al.

(10) Patent No.: US 11,541,453 B2
(45) Date of Patent: Jan. 3, 2023

(54) MOLDING TOOL FOR MOLTEN METAL OR GLASS

(71) Applicant: SGL CARBON SE, Wiesbaden (DE)

(72) Inventors: Oswin Öttinger, Meitingen (DE); Dominik Rivola, Meitingen (DE); Sebastian Schulze, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 1255 days.

(21) Appl. No.: 15/778,307

(22) PCT Filed: Nov. 24, 2016

(86) PCT No.: PCT/EP2016/078744
§ 371 (c)(1),
(2) Date: May 23, 2018

(87) PCT Pub. No.: WO2017/089499
PCT Pub. Date: Jun. 1, 2017

(65) Prior Publication Data
US 2018/0345361 A1  Dec. 6, 2018

(30) Foreign Application Priority Data
Nov. 24, 2015 (DE) ..................... 10 2015 223 239.5

(51) Int. Cl.
| | |
|---|---|
| B22C 1/00 | (2006.01) |
| B22D 17/22 | (2006.01) |
| C04B 35/52 | (2006.01) |
| C04B 35/532 | (2006.01) |
| C04B 35/626 | (2006.01) |
| B33Y 10/00 | (2015.01) |
| B29C 64/165 | (2017.01) |
| B33Y 80/00 | (2015.01) |
| C03B 19/02 | (2006.01) |

(52) U.S. Cl.
CPC ............ B22D 17/2209 (2013.01); B22C 1/00 (2013.01); B29C 64/165 (2017.08); B33Y 10/00 (2014.12); B33Y 80/00 (2014.12); C03B 19/025 (2013.01); C04B 35/522 (2013.01); C04B 35/532 (2013.01); C04B 35/6267 (2013.01); C04B 2235/48 (2013.01); C04B 2235/5296 (2013.01); C04B 2235/5418 (2013.01); C04B 2235/5427 (2013.01); C04B 2235/5445 (2013.01); C04B 2235/614 (2013.01); C04B 2235/616 (2013.01); C04B 2235/77 (2013.01); C04B 2235/9607 (2013.01)

(58) Field of Classification Search
CPC ........ B22C 1/00; B22D 17/22; B22D 17/2209
USPC ............................... 164/6, 15, 519, 520, 529
See application file for complete search history.

(56) References Cited

U.S. PATENT DOCUMENTS

2014/0212677 A1    7/2014   Gnüchtel et al.

FOREIGN PATENT DOCUMENTS

| CN | 104 841 869 A | 8/2015 |
|---|---|---|
| DE | 10 2014 004 692 A1 | 10/2015 |
| EP | 2832708 A1 | 2/2015 |
| JP | H11 244992 A | 9/1999 |
| WO | 02/095080 A2 | 11/2002 |
| WO | 02/101103 A2 | 12/2002 |
| WO | 2008/033664 A1 | 3/2008 |
| WO | 2012/175072 A1 | 12/2012 |
| WO | 2015/038260 A2 | 3/2015 |
| WO | 2015/120429 A1 | 8/2015 |

OTHER PUBLICATIONS

International Search Report and written Opinion dated Feb. 2, 2017 of corresponding International application No. PCT/EP2016/078744; 9 pgs.
N.N.: "Broad Base. Best Solutions. Specialty Graphites for the Glass and Refractory Industries Graphite Materials and Systems", May 29, 2015 (May 29, 2015), XP055337092, Retrieved from the Internet <URL:http://www.sglgroup.com/cms/_common/downloads/products/product-groups/gs/brochures/Specialty_Graphites_for_the_Glass_and_Refractory_Industries_e.pdf> [retrieved on Jan. 19, 2017], 12 pgs.
Dirk Godlinski et al: "Steel Parts with Tailored Material Gradients by 3D-Printing Using Nano-Particulate Ink", Materials Science Forum, vol. 492-493, Jan. 1, 2005 (Jan. 1, 2005), pp. 679-684, 6 pgs.
Kuchling: "Harri Deutsch Verlag", 1991, article "Taschenbuch der Physik", 2 pgs.
Paul J. Ellis: "Shot Coke", Light Metals, 1996, pp. 477-484, 8 pgs.
Recknagel et al.: "Spezialsande—Formgrundstoffe für die moderne Kern-und Formherstellung", 2008, Hüttenes-Albertus Chemische Werke Gmbh, 14 pgs.
Tilch et al.: "Einfluss alternativer Formgrundstoffe auf die Eigenschaften von Formstoff und Gussteil", Giesserei, vol. 93, Aug. 2006 (Aug. 1, 2006), pp. 12-24, 13 pgs.

*Primary Examiner* — Kevin P Kerns
(74) *Attorney, Agent, or Firm* — Maier & Maier, PLLC

(57) ABSTRACT

A molding tool made of carbon or graphite, namely a casting mold or a casting core for the processing of molten metal or to a molding tool for the processing of molten glass, such as for example a blow mold and a method for producing the molding tool.

5 Claims, No Drawings

MOLDING TOOL FOR MOLTEN METAL OR GLASS

FIELD

The present invention relates to a moulding die made of carbon or graphite, specifically a casting mould or a casting core for processing molten metal or a moulding die for processing molten glass, for example a blow mould. The present invention also relates to a method for producing the moulding die.

BACKGROUND

Moulding dies, as are used in foundries, typically consist of grains connected so as to form a mould, or the "basic moulding materials". The term "basic moulding materials" is defined in VDG reference sheet R 201 "Gießerei-Formstoffe—Begriffe" ("Foundry moulding materials—Definitions"), as follows: "The basic moulding material is sand which forms the main constituent of the moulding material as a filler. Basic moulding materials do not generally have a binder function. Sand is a collection of grains, mostly in the size fraction of from 0.063 to 1.50 mm."

Moulding dies for metal casting can be produced from sand by means of the 3D printing method. In this process, alternating layers of sand and a binder are applied one on top of the other so as to form a three-dimensional layer structure. By means of 3D printing, it is possible in principle to produce any desired complex shapes in one piece in a cost-effective manner. However, for the use as a casting mould or casting core for processing molten metal, there are certain requirements on the material in terms of stability and strength. In principle, 3D-printed moulding dies made of sand meet these requirements.

In addition to silica sand, there are a multiplicity of special sands which are used as basic moulding materials in order to meet the various requirements for the quality of the cast part.

One of the main causes for casting defects is expansion, which is triggered by the high thermal expansion behaviour of the sand. Among other things, this makes it more difficult to then process cast parts, that is, if they have not already been scrapped. In order to reduce these casting defects, special sands have been developed, such as zircon sand, but these are very costly.

Another cause of the negative influence on the casting quality is the typically low heat conductivity of sands, for example silica glass: 1.36 W/(m*K) at room temperature (see Kuchling, "Taschenbuch der Physik", Harri Deutsch Verlag, 1991); moulding material consisting of sand typically <0.2 W/(m*K) at room temperature (see Recknagel et al. "Spezialsande—Formgrundstoffe für die moderne Kern- und Formherstellung", pamphlet Hüttenes-Albertus chemische Werke GmbH, published 2008). As a result, the cast metal part cools rather slowly, meaning that a coarser microstructure is in principle produced in the metal. However, faster cooling of metal results in a finer microstructure having small dendrites and small grain sizes in the different phases in the metal, this ultimately leading to a higher strength of the cast component.

SUMMARY

A further drawback is the typically high bulk density of sands of generally more than 1.5 g/cm³ (see Tilch et al. "Einfluss alternativer Formgrundstoffe auf die Eigenschaften von Formstoff und Gussteil", Giesserei 93, 08/2006, pages 12-24). A high bulk density is in particular a drawback for casting cores because these have to be fixed inside a mould and kept in position. Lighter casting cores are therefore advantageous.

A material which is better than sand, in terms of the above-mentioned material-based drawbacks, is carbon or graphite. These materials have a lower thermal expansion, a higher heat conductivity (for example, graphite: 169 W/(m*K) at room temperature (see Kuchling, "Taschenbuch der Physik", Harri Deutsch Verlag, 1991)) and a lower bulk density than sands. Casting moulds made of carbon are described in GB799331A, for example. Moulds of this kind are produced by adding a mixture consisting of coke particles and binder resin to a compression die and said mixture thus being compressed. However, by means of this method, it is not readily possible to produce complex shapes comprising undercuts or cavities, for example. These have to be produced by joining individual moulded components. This results in multi-part casting moulds and presents the problem of precisely joining and positioning the moulded components. Furthermore, moulding by means of compression often leads to anisotropy in the thermal expansion behaviour as the force of compression typically acts in one direction only and the particles in the mixture thus become aligned in their orientation.

The object of the present invention is therefore to provide a moulding die which is easy and cheap to produce, can adopt any desired complex geometry, has a uniform microstructure, has material properties which are better than those of sands, and has comparable stability and strength at the same time, so that said moulding die is suitable for being used as a casting mould or casting core for processing molten metal or as a moulding die for processing molten glass, such as a blow mould.

The object is achieved by a particle-containing moulding die for molten metal or glass, at least 50 wt. % of the particles consisting of carbon particles, the particles being interconnected by means of a binder, the moulding die consisting of the particles in a proportion of at least 90 wt. %, the moulding die having a geometric density of from 0.7 g/cm³ to 1.4 g/cm³, and the moulding die having an anisotropy factor with respect to thermal expansion of less than 1.2.

One advantage over moulding dies made of sand is that carbon is electrically conductive, and the moulding die according to the invention can thus be heated just before the moulding, either by means of resistance heating or inductively and with a particularly uniform temperature distribution.

A further advantage over moulding dies made of sand is that in particular casting cores can be burned out for demoulding following the cast.

The moulding die according to the invention is also suitable in particular for glass blowing on account of its porosity. The corresponding moulding dies are typically moistened with water or steamed before the glass blowing so as to form a layer of steam between the glass and the moulding die. The surface of the moulding die does not, where possible, come into direct contact with the glass. For this purpose, a high and uniform porosity is required. The moulding die according to the invention provides said porosity.

Within the scope of the present invention, it has been found that, for the uses as casting moulds or casting cores and moulding dies for processing molten glass, for example blow moulds, it is possible to obtain sufficiently stable moulding dies made of carbon by means of the 3D printing method. The moulding die according to the invention is distinguished from known casting moulds made of coke in terms of its high isotropy, which it is believed is caused by the production method. Within the scope of the present invention, an anisotropy factor of less than 1.2 means that the coefficients of thermal expansion in any of the three directions (x-direction, y-direction and z-direction) do not differ by more than 20%. The anisotropy factor is preferably less than 1.1, more preferably less than 1.05. According to the specific embodiment described in example 2 below, anisotropy factors of less than 1.02 may even be obtained. This high isotropy with respect to thermal expansion advantageously leads to improved dimensional accuracy of the cast parts.

Within the scope of the present invention, for the sake of simplicity the term "cast parts" is also understood to mean the corresponding glass products that are produced by means of the moulding die of the present invention. The term "cast part" is therefore not to be understood as being limited to the metal cast part only. Accordingly, within the scope of the present invention, the term "moulding die" is understood to mean either a casting mould or a casting core for the metal cast part or the glass cast part, or a blow mould for glass blowing.

According to the invention, at least 50 wt. % of the particles in the moulding die consist of carbon particles. However, for reasons of more uniform properties and recyclability, preferably at least 90 wt. % of the particles in the moulding die consist of carbon particles, and most preferably unmixed particles are used.

The moulding die preferably has a complex geometry having undercuts or cavities and has a uniform structure. Within the scope of the present invention, uniform structure means that junctions or joints in the moulding die are avoided. If, when removing cast components from a casting mould, it is necessary to work with separated shapes, i.e. which are joined together from a plurality of parts, said shapes are also covered by the present invention.

The used carbon particles are not particularly limited. They comprise amorphous carbon and graphite and any mixtures thereof. The carbon particles preferably comprise acetylene coke, flexicoke, fluid coke, shot coke, hard coal tar pitch coke, carbon black coke, synthetic graphite, spherical graphite, microcrystalline natural graphite, anthracite or a granulate of coke, said carbon particles more preferably consisting thereof or of a mixture thereof, as the corresponding moulding die has a particularly high thermal conductivity. However, macrocrystalline natural graphite (flake graphite) and carbons and graphite based on needle cokes are less preferred as these materials are generally in a particle form which is not favourable for 3D printing. All types of coke may be in the form of green coke, which has been carbonised or graphitised, i.e. treated at a high temperature of more than 500° C., or more than 2,000° C. The same applies to anthracites. However, the types of coke are preferably in the form of carbonised or graphitised coke as these contain fewer volatiles and have a low thermal expansion. The preferred types of coke mentioned are advantageous because the particles thereof are, with respect to the shape factor (particle width/particle length), approximately spherical, i.e. round. This leads to improved processability in the 3D printing and to more uniform and more isotropic properties of the 3D-printed moulding dies.

Hard coal tar pitch cokes and synthetic fine-grain graphites are particularly preferred as they have particularly isotropic properties, for example with respect to the coefficients of thermal expansion. Hard coal tar pitch coke is produced as follows: when producing metallurgical coke from hard coal, hard coal tar is produced as a biproduct. Said tar is distilled, and the residue is recoked. Lastly, the obtained pitch coke is ground.

Furthermore, acetylene coke, flexicoke, fluid coke and shot coke are particularly preferred as they are more resistant to wear than graphite on account of their greater hardness. This has advantages for example when recycling the particles once the moulding die according to the invention has been used. In particular casting cores are suitable only for one-time use as they have to be destroyed in order to be removed from the cast part, for example by the particles being mechanically removed. Furthermore, these types of coke are advantageous because the particles thereof have an approximately spherical shape, i.e. are round. This leads to even further improved processability in the 3D printing and to more uniform and more isotropic properties of the 3D-printed moulding dies. In this respect, acetylene coke is most preferred as it has few impurities and a particularly spherical shape. Acetylene coke is therefore also most preferred because this type of coke is particularly pure. Its ash value is approximately 0.01%, and the metal impurities, such as Na, Ni, Fe and V, are typically consistently well below 50 ppm. However, flexicoke has an ash value in the 1% range. The above-mentioned metal impurities are in the range of from several 100 ppm to more than 1,000 ppm. Many of these impurities can have a catalytic effect on the oxidation behaviour of the carbon material. Impurities, such as nickel oxide, in highly impure cokes having contents of more than 0.1% are even graded as category 1A carcinogens, meaning that handling and processability and the use of highly impure cokes is considerably limited. Furthermore, the moulding dies according to the invention made of acetylene coke have a particularly high green density and a higher breaking strength than those made of flexicoke, for example. The reason for this strength is possibly that acetylene coke has an onion-like layer structure. The embodiment that is most preferred according to the invention is therefore a moulding die according to the invention in which the carbon particles contained therein comprise acetylene coke or, preferably, consist of acetylene coke.

Fluid coke and flexicoke are based on crude oil processing. Following atmospheric and vacuum distillation of crude oil, the residue is coked by means of "fluid coking" or "flexicoking", both of which typically take place in a continuous fluidised bed, which leads to largely spherical particles. During acetylene production, which is described for example in DE 29 47 005 A1, acetylene coke accumulates as a waste product, which is initially green, i.e. contains volatile constituents. Shot coke is an isotropic type of coke of which the particles tend to be spherical and which have an onion-like layer structure in part (see: Paul J. Ellis, "Shot Coke", Light Metals, 1996, pages 477-484).

Carbon black coke is produced by a mixture of carbon black and pitch being coked and then ground. As the carbon black particles themselves are very small, generally in the nanometre range, ground carbon black coke particles automatically adopt an approximately round geometry having isotropic properties.

If synthetic graphite is used, fine-grain graphite is preferred on account of its low anisotropy. In a similar manner to carbon black coke, the particles of ground fine-grain graphite also automatically adopt an approximately round geometry.

Spherical graphite is based on natural graphite and is a granulate of natural graphite flakes together with a binder. It also has an approximately spherical geometry. Spherical graphite is in particular preferred if the moulding die is intended to have a particularly high thermal conductivity.

A granulate of coke is understood to mean granulates of any possible type of coke having a polymer binder. Granulates are preferred because particles having an approximately round geometry are also obtained by means of granulation.

Within the scope of the present invention, it is possible for a liquid activator, such as a liquid sulfuric acid activator, to be added to the coke. By using an activator, the curing time and the necessary temperature for curing the binder are reduced. The formation of dust in the powdered composition is also reduced. The amount of activator is advantageously from 0.05 wt. % to 3 wt. %, more preferably from 0.1 wt. % to 1 wt. %, based on the total weight of coke and activator. If more than 3 wt. % is used, based on the total weight of activator and coke, the powdered composition sticks together and flowability is reduced. If less than 0.05 wt. % is used, based on the total weight of coke and activator, the amount of activator which can react with the binder is too small to achieve the desired above-mentioned advantages.

According to the invention, the moulding die has a low geometric density of from 0.7 g/cm$^3$ to 1.4 g/cm$^3$, preferably from 0.8 g/cm$^3$ to 1.2 g/cm$^3$. A material which is lighter than the moulding dies from the prior art can thus be obtained, this also leading to a lower thermal capacity. This means that less energy is required to pre-heat the moulding die. Furthermore, when de-moulding by means of burning out, a less dense material is advantageous as this process is faster.

The quantitative majority of the particles in the moulding die according to the invention preferably has a largely spherical shape. This means that at least 50%, particularly preferably more than 70% and even more preferably more than 90% of the particles have a largely spherical shape. A largely spherical shape is understood to mean that the majority (more than 50%) of the surface of a particle is continuously spherically curved, i.e. has no breaking edges or spikes. This is advantageous for better handling during 3D printing.

According to a preferred embodiment of the present invention, the particles in the grain size range of the d50 value have, on average, a shape factor (particle width/particle length) of at least 0.5, more preferably at least 0.6, even more preferably at least 0.7, and most preferably at least 0.8. The shape factor is understood to mean the ratio of particle width to particle length. The grain size range of the d50 value is understood to mean the range of d50+/−10%. The shape factor is a measure of the roundness of the particles. As has already been explained above, rounder particles are distinguished by noticeably better handling during 3D printing. This affects the flowability, for example. Furthermore, by means of approximately round particles, a denser packing of spheres in the moulding die can be achieved, this ultimately leading to higher stability and strength of the moulding die. The shape factor was determined, as per ISO 13322-2, by means of a "Camsizer" device from Retsch Technology. In this process, the width and the length of the particles are determined by means of a camera and an image analysis system and compared to form a ratio. In the case of particularly fine powder, the shape factor may alternatively be determined on the basis of micrographs together with associated image analysis. The advantage of practically round particles is reliable 3D printing, trouble-free powder application and the lower tendency for cracks to appear during thermomechanical loading. Furthermore, it has been found that, the rounder the particles, the better, i.e. higher, the work of fracture and the elongation at break of the corresponding components.

According to a preferred embodiment of the present invention, the particles have a grain size (d99) of less than 1 mm, preferably less than 0.6 mm. Coarser coke is more difficult to process by means of 3D printing. The term "d99" means that 99% of the particles are smaller than the indicated value. The d99 value was determined using the laser granulometry method (ISO 13320), a measurement device from Sympatec GmbH being used together with associated analysis software. Furthermore, in the case of coarser particles, a surface which is too coarse is obtained in the subsequent cast component, or the moulding die for the metal or glass to be moulded. If the preferred types of coke, i.e. acetylene coke, flexicoke, fluid coke and shot coke, are used, which already have an inherently practically round geometry, the grain sizes larger than 1 mm are removed by screening, instead of grinding the coke to a desired size. It is thus possible to preserve the original roundness of the particles. Furthermore, this leads to a more uniform moulding die as no coarse grains are contained therein. Ultimately, this also results in a finer and more uniform pore and surface structure of the moulding die and thus to an improved surface quality of the cast part, i.e. to a smoother surface. This is a further advantage over the known casting moulds made of carbon which are produced according to the teaching of GB799331A, for example.

The binder in the moulding die according to the invention is not particularly limited. Possible binders include phenol resin, furan resin, cellulose, starch, sugar or silicates, in particular water glass. However, the binder preferably comprises cured phenol resin, cured furan resin or water glass as the corresponding moulding dies have particularly high strength and stability.

According to a preferred embodiment of the present invention, the binder consists of carbon and forms, together with carbon particles in the moulding die, a continuously and integrally connected carbon network. Said embodiment is particularly advantageous if outgassing is to be avoided, which otherwise occurs as a result of the decomposition of the binder, on account of the high temperatures when metal or glass is moulded.

According to a preferred embodiment of the present invention, the proportion of binder in the moulding die is from 1 to 10 wt. %, more preferably from 2 to 8 wt. % and most preferably from 3 to 5 wt. %, based on the total weight of the moulding die, excluding any mould wash which may be present, as is described below. In this connection, the proportion according to the invention of the particles in the moulding die is also understood to be at least 90 wt. %. The proportions specified relate only to the total weight of binder and particles. In relation to the embodiment in which the binder consists of carbon, the preferred proportion of binder in the moulding die is even lower, specifically from 1 to 6 wt. %, more preferably from 1 to 4 wt. % and most preferably from 1 to 3 wt. %, based on the total weight of binder and particles.

According to a preferred embodiment of the present invention, the moulding die has a coefficient of thermal expansion, measured at between room temperature and 150° C., of less than 8 μm/(m*K). In relation to the embodiment in which the binder consists of carbon, even lower coefficients of thermal expansion can be achieved, specifically preferably less than 5 μm/(m*K), more preferably less than 4 μm/(m*K). Within the scope of the present invention, room temperature is understood to mean 25° C. The coefficient of thermal expansion is measured with reference to DIN 51909. The moulding die preferably has a thermal conductivity at room temperature of at least 0.3 W/(m*K), preferably at least 0.5 W/(m*K), the measurement taking place with reference to DIN 51908. A lower thermal conductivity leads to longer cooling times of the cast part and thus, as is described above, to a coarser cast microstructure and less stable cast parts.

The moulding die according to the invention may comprise, at the surface thereof, the mould washes or separating agents which are common in foundries, depending on the metal to be processed, or in glass processing, for example based on $Al_2O_3$. Alternatively, surface coatings of pyrocarbon or SiC may be applied by means of gas phase deposition. However, the moulding die according to the invention preferably does not comprise an additional mould wash, a separating agent or a coating at the surface of the moulding die since carbon and graphite inherently have milder wetting behaviour than sand towards most metal melts. Separating agents and the like are therefore not generally necessary.

A further aspect of the present invention relates to a method for producing a moulding die for molten metal or glass, comprising the following steps:
a) providing a powdered composition, which consists of carbon particles in a proportion of at least 50 wt. %,
b) providing a liquid binder,
c) planarly depositing a layer of the material provided in a), and locally depositing droplets of the material provided in b) to said layer, and repeating step c) a discretionary number of times, the step of locally depositing the droplets in subsequent repetitions of said step c) being adjusted according to the desired shape of the moulding die to be produced,
d) curing or drying the binder and obtaining the moulding die.

"Repeating a discretionary number of times" is understood to mean that the steps of planarly depositing a layer of the material provided in a) and locally depositing droplets of the material provided in b) to said layer is repeated as often as desired.

The obtaining of the moulding die within the scope of the present invention is understood to mean the following. Immediately after the binder has been cured or dried, the moulding die is still surrounded by a powder bed consisting of loose particles of the powdered composition. The moulding die therefore has to be removed from the powder bed or separated from the loose, non-solidified particles. This is also described in the literature on 3D printing as "unpacking" the printed component. The unpacking of the moulding die may be followed by fine-cleaning said moulding die in order to remove unseparated particle residue. The unpacking can take place, for example, by sucking the loose particles using a powerful suction device. However, the manner of unpacking is not particularly limited, and any known method can be used.

The above-described moulding die according to the invention can be obtained by means of the method according to the invention. All the definitions and embodiments mentioned in relation to the moulding die according to the invention therefore also apply accordingly to the method according to the invention, or to the materials used in the method.

According to a preferred embodiment of the present invention, the moulding die is heat-treated at at least 500° C. As a result, all volatiles in the binder are driven out, which is advantageous for the use of the moulding die according to the invention. This heat treatment is also referred to as carbonisation. According to a more preferred embodiment of the present invention, the moulding die is heat-treated at at least 2,000° C., preferably at least 2,400° C. As a result of this increase in temperature, the thermal conductivity is further increased as the moulding die has a graphitised, or graphitic, microstructure. This heat treatment is also referred to as graphitisation. Carbonisation and graphitisation may take place separately or in one step.

According to a preferred embodiment of the present invention, the moulding die is subject to supplementary densification one or more times, this process comprising the following steps:
impregnating with a carbon-delivering medium, and
carbonising at a temperature of between 500° C. and 1,300° C.

By means of this supplementary densification, the binder is firstly converted to carbon, and the proportion of binder is secondly increased, this leading to a more stable moulding die. The carbon-delivering medium may be a carbon-containing liquid, such as a polymer, such as phenol resin, furan resin or pitch. However, it is also possible for the supplementary densification to take place by means of gas phase infiltration (chemical vapour infiltration (CVI)). In this process, the two supplementary densification steps take place in situ, i.e. in one step, since a hydrocarbon gas is used as the carbon-delivering medium and the gas phase deposition typically takes place at from approximately 700° C. to 1,300° C.

The powdered composition according to the invention consists of the particles described in connection with the moulding die according to the invention. All of the embodiments and advantages mentioned in this connection can therefore also be applied to the powdered composition according to the invention. The same applies accordingly to the liquid binder in step b). Said binder is the starting material for the binder in accordance with the moulding die according to the invention. The liquid binder in step b) preferably comprises phenol resin, furan resin, water glass or mixtures thereof. These may also be in the form of a solution.

A further aspect of the present invention relates to a moulding die which can be obtained in accordance with the method according to the invention. By means of the method of production of the moulding die, in particular 3D printing, the above-described advantageous properties can be achieved in moulding dies for the first time.

The present invention will be illustrated below on the basis of examples.

EXAMPLE 1

Calcined hard coal tar pitch coke was ground and, following grinding and screening at a screen size of from 0.4 mm, had a grain size distribution of d10=130 µm, d50=230 µm and d99=500 µm and an average shape factor of 0.69 (in the grain size range of d50+/−10%). The grain size distribution was determined by means of laser granulometry. 1 wt. % of a liquid sulfuric acid activator for phenol resin, based on the total weight of coke and activator, was first added to the coke, which was then processed by a 3D printing powder bed machine. In this process, a doctor blade unit deposits a thin layer of coke powder (approximately 0.3 mm in height) on a flat powder bed, and a type of inkjet printing unit prints an alcoholic phenol resin solution onto the coke bed according to the desired component geometry. The printing table is subsequently lowered by a degree equal to the layer thickness, a layer of coke is re-applied, and phenol resin is locally printed on again. By means of the repeated procedure, rectangular test specimens having the dimensions 172 mm (length)×22 mm (width)×22 mm (height) were constructed. Once the complete "component" had been printed, the powder bed was introduced into a furnace that had been pre-heated to 140° C., and was kept there for approximately six hours. In the process, the phenol resin cures and forms a dimensionally stable component. Following cooling, the excess coke powder was sucked away, and the component was removed.

Once the binder had cured, the density of the component was 0.83 g/cm³ (example 1.1). The density was determined geometrically (by weighing and determining the geometry). The component had a proportion of resin of 5 wt. %, which was determined by carbonisation treatment. This process proceeded such that the carbon yield of the used cured resin constituent was determined in advance to be 58 wt. % by means of thermogravimetric analysis (TGA) in the absence of oxygen. On the basis of the loss in mass of the component following the subsequent carbonisation at 900° C. in a protective gas atmosphere for one hour, it was possible to calculate the original resin component in the component.

The carbonised component was subsequently impregnated with phenol resin and carbonised again at 900° C. This increased the density to 1.08 g/cm³. Within the scope of the present invention, this procedure is described as supplementary densification and is mentioned below as example 1.2.

A selection of the carbonised test specimens was then additionally treated at a high temperature in a protective gas atmosphere. An end temperature of 2,000° C. (example 1.3) was selected in one case, and an end temperature of 2,800° C. (example 1.4) was selected in another. As the temperature rises, the amorphous carbon is converted to the graphite structure. The densities of the test specimens remained approximately constant at 1.1 g/cm³ in this process. The reason for the slight increase in density is the shrinkage during high-temperature treatment. This shrinkage always occurs if the end temperature of the high-temperature treatment is significantly below the calcination temperature of the coke.

After the test specimens had been produced, they were characterised. The properties are summarised in Table 1.

EXAMPLE 2

Calcined acetylene coke, as delivered and without being ground, was subject to protective screening at a screen size of 0.4 mm. The screened acetylene coke then had a particle size distribution of d10=117 µm, d50=190 µm and d99=360 µm and a shape factor of 0.82. In a first step, 0.35 wt. % of the liquid activator according to example 1 was added to the coke powder, which was then processed so as to form components in the same way as example 1, test specimens being produced in order to determine the isotropy with respect to thermal expansion for all three directions (x, y, z).

The components produced in this way had a proportion of resin of 3.0 wt. %. The density of the test specimens was 0.96 g/cm³ (examples 2.1x, 2.1y and 2.1z) and was thus significantly higher than for the ground hard coal tar pitch coke from example 1. Some of the test specimens for the X orientation were then impregnated with a phenol resin, this resulting in a density of 1.2 g/cm³ (example 2.2). The resin-impregnated test specimens were then carbonised at 900° C. in the same way as example 1, this resulting in a final density of 1.09 g/cm³. All test specimens of this embodiment were characterised. The results are summarised in Table 1.

EXAMPLE 3

Ground synthetic fine-grain graphite powder was screened, the grain fraction of from 0.1 to 0.2 mm being removed. The particle size analysis of the selected screening fraction produced the following result: d10=120 µm, d50=170 µm and d99=250 µm. In a first step, 1 wt. % of the liquid activator according to example 1 was added to the flowable graphite powder, which was then processed, with an increased amount of resin being introduced, so as to form components in the same way as example 1. Once the binder had cured, the density of the test specimens was 1.0 g/cm³. The proportion of phenol resin was determined to be 10 wt. %, and the test specimens were characterised in line with the above examples (see Table 1).

EXAMPLE 4

Calcined flexicoke, as delivered and without being ground, was subject to protective screening at a screen size of 0.4 mm. The screened flexicoke then had a particle size distribution of dl0=85 µm, d50=120 µm and d99=220 µm. In a first step, 0.33 wt. % of the liquid activator according to example 1 was added to the coke powder, which was then processed so as to form components in the same way as example 1.

The components produced in this way had a proportion of resin of 7 wt. %. The density of the test specimens was 0.82 g/cm³. The bending strength, determined in a three-point bending test, was 0.7 GPa. The three-point bending strength was 3.8 MPa. If these values are compared with those for acetylene coke samples (see example 2.1), the superiority of the material based on acetylene coke becomes clear. In spite of a lower resin content, the samples based on acetylene coke have considerably higher strength and stiffness. A lower resin content at the same time as high mechanical strength with acetylene coke as the raw material is particularly advantageous as fewer volatile gases are produced when the moulding die is used, this making it possible to use the moulding die in an environmentally friendly manner.

Analysis

The following table shows a number of physical properties of the test specimens produced:

TABLE 1

Material characteristic values of the embodiments (averages)

| Example no. | 1.1 | 1.2 | 1.3 | 1.4 | 2.1 | 2.2 | 3 |
|---|---|---|---|---|---|---|---|
| AD (g/cm³) | 0.83 | 1.08 | 1.10 | 1.10 | 0.96 | 1.09 | 1.0 |
| ER (Ohmµm) | 50,000 | 230 | 160 | 45 | 130,000 | 1,100 | 10,000 |
| YM 3p (GPa) | 0.3 | 1.3 | 0.5 | 0.3 | 1.5 | 0.3 | 1.1 |
| FS 3p (MPa) | 0.4 | 2.4 | 1.6 | 1.3 | 5.7 | 1.7 | 4.0 |
| CTE RT/150° C. (µm/(m*K)) | 4.4 | 3.6 | 3.2 | 2.8 | 5.6 (x direction) 5.6 (y direction) 5.5 (z direction) | 4.7 | 5.1 |

TABLE 1-continued

Material characteristic values of the embodiments (averages)

| Example no. | 1.1 | 1.2 | 1.3 | 1.4 | 2.1 | 2.2 | 3 |
|---|---|---|---|---|---|---|---|
| TC (W/(m*K)) | 0.5 | | 2.7 | 20 | | | 1.1 |

AD (g/cm$^3$): density (geometric) with reference to ISO 12985-1
ER (Ohm·µm): electrical resistance with reference to DIN 51911
YM 3p (GPa): modulus of elasticity (stiffness), determined from the three-point bending test
FS 3p (MPa): three-point bending strength with reference to DIN 51902
CTE RT/150° C. (µm/(m*K)): coefficient of thermal expansion, measured at between room temperature and 150° C. with reference to DIN 51909
TC (W/(m*K)): heat conductivity with reference to DIN 51908
Example 1.1: hard coal tar pitch coke, green body having a proportion of resin of 5 wt. %
Example 1.2: hard coal tar pitch coke, green body having a proportion of resin of 5 wt. %, additionally impregnated with phenol resin, carbonised at 900° C.
Example 1.3: hard coal tar pitch coke, green body having a proportion of resin of 5 wt. %, additionally impregnated with phenol resin, carbonised at 900° C. and treated at a high temperature of 2,000° C.
Example 1.4: hard coal tar pitch coke, green body having a proportion of resin of 5 wt. %, additionally impregnated with phenol resin, carbonised at 900° C. and graphitised at 2,800° C.
Example 2.1: acetylene coke, green body having a proportion of binder resin of 3 wt. %
Example 2.2: acetylene coke, green body having a proportion of binder resin of 3 wt. % and subsequently impregnated with phenol resin, carbonised at 900° C.
Example 3: synthetic graphite having a proportion of binder of 10%

As all the examples show, the method according to the invention makes it possible to obtain material data which are in principle suitable for moulding dies and of which some have greater strengths than comparable established sand-based moulding materials.

Furthermore, the density values of all the test specimens are advantageous as they lead to lighter moulding dies.

The test specimens which were subsequently heat-treated demonstrate advantageous electrical conductivity, which opens up the option of resistance heating or inductive heating.

The low values for the modulus of elasticity are particularly advantageous as the thermal shock resistance of the moulding die is thus increased.

The strengths of the test specimens are consistently sufficient for the uses according to the invention. However, noteworthy are the high strengths when the binder content is high and in particular if acetylene coke is used, which strengths even exceed those of corresponding moulding dies made of sand.

Furthermore, the values for the coefficient of thermal expansion are at a low level and can be lowered still by further heat treatment (carbonisation and graphitisation), an extremely low level thus being achieved. It can also be observed in particular that the material is highly isotropic with respect to the coefficient of thermal expansion. This ensures dimensional accuracy, for example during casting, and ensures a constant ratio of the dimensions of the cast part.

Lastly, the values for the thermal conductivity are high in comparison with moulding dies made of sand. Higher thermal conductivities are achieved if graphite and/or high binder contents are selected (see example 3). The thermal conductivity can be increased further still by means of subsequent heat treatment (carbonisation/graphitisation) (see examples 1.3 and 1.4).

The invention claimed is:

1. A method for producing a moulding die for molten metal or glass, comprising the following steps:
   a) providing a powdered composition, which consists of carbon particles in a proportion of at least 50 wt. %,
   b) providing a liquid binder,
   c) planarly depositing a layer of the powdered composition provided in a), and locally depositing droplets of the liquid binder provided in b) to said layer, and repeating step c) a discretionary number of times, wherein the step of locally depositing the droplets in subsequent repetitions of said step c) is adjusted according to a desired shape of the moulding die to be produced,
   d) curing or drying the binder and obtaining the moulding die;
   wherein the carbon particles consist of acetylene coke.

2. The method according to claim 1, wherein the moulding die is heat-treated at least 500° C.

3. The method according to claim 1, wherein the moulding die is heat-treated at least 2,000° C.

4. The method according to claim 1, wherein the moulding die is subject to supplementary densification one or more times, this process comprising the following steps:
   impregnating with a carbon-delivering medium, and
   carbonising at a temperature of between 500° C. and 1,300° C.

5. The method according to claim 1, wherein the particles of the powdered composition in the grain size range of d50 have a shape factor (width/length) of at least 0.5 on average.

* * * * *